United States Patent [19]

Hunter

[11] 4,188,420
[45] Feb. 12, 1980

[54] METHOD FOR COATING WIRE ON A SPOOL

[75] Inventor: Edward E. Hunter, Akron, Ohio

[73] Assignee: The Goodyear Tire & Rubber Company, Akron, Ohio

[21] Appl. No.: 898,273

[22] Filed: Apr. 20, 1978

Related U.S. Application Data

[62] Division of Ser. No. 682,710, May 3, 1976, Pat. No. 4,109,609.

[51] Int. Cl.² ............................................... B05C 3/10
[52] U.S. Cl. .................................... 427/295; 427/116; 427/435; 118/50; 118/64; 118/429; 118/500
[58] Field of Search ............... 427/294, 295, 296, 297, 427/298, 116, 435; 118/50, 50.1, 64, 48–49.5, 429, 500; 214/17 B

[56] References Cited

U.S. PATENT DOCUMENTS

| | | | |
|---|---|---|---|
| 2,124,162 | 7/1938 | Eddison et al. | 118/50 X |
| 2,369,561 | 2/1945 | Grisdale | 118/48 |
| 2,847,330 | 8/1958 | Toulmin, Jr. | 118/48 X |
| 2,858,795 | 11/1958 | Walker | 118/50 |
| 3,584,847 | 6/1971 | Hammond, Jr. et al. | 118/48 X |
| 3,801,360 | 4/1974 | Dahlgren | 118/50 X |
| 3,895,138 | 7/1975 | Sewell et al. | 118/50 X |

FOREIGN PATENT DOCUMENTS

| | | | |
|---|---|---|---|
| 838515 | 12/1938 | France | 118/49 |
| 112794 | 12/1965 | Netherlands | 118/634 |

Primary Examiner—Ralph S. Kendall
Attorney, Agent, or Firm—R. S. Washburn

[57] ABSTRACT

A device for coating wire tire cord on a spool with an agent for increasing the bond between the wire tire cord and rubber material used in the production of tires. The device is composed of at least one hollow pipe which forms a chamber in which the spools of wire are coated. The pipe is declined to help facilitate movement of the spools of wire through the pipe and allow drainage of any trapped liquid from the pipe. A hydraulic cylinder is provided adjacent the mouth of the pipe to engage and push a number of spools, in tandem, through the pipe in axially aligned, end-to-end relation. Means are supplied for circulating a liquid, containing the agent, into the chamber and for alternately creating a vacuum and pressure within the chamber to increase penetration of the liquid coating into the interstices between segments of wire cord wrapped on the spools. Other means are provided for circulating a heated fluid in the chamber to dry the liquid coating on the wire of each spool being treated.

1 Claim, 4 Drawing Figures

METHOD FOR COATING WIRE ON A SPOOL

This is a Division of application Ser. No. 682,710 filed May 3, 1976, U.S. Pat. No. 4,109,609.

BACKGROUND OF THE INVENTION

The invention is particularly well suited for coating wire tire cord wound on a spool, although the technology involved is also applicable to coating textile cord wound on a spool. It has been found cheaper and more convenient, from a handling standpoint, to coat the wire when it is on a spool, rather than removing the wire from the spool before coating it.

Coiled wire armatures for motors have been coated by dipping then in vertically disposed vats of liquid coating material. In such cases, the armatures are first placed under a vacuum to remove any moisture from the wire. The vacuum is gradually decreased as the vat is slowly filled with liquid coating, under pressure, the pressure being utilized to increase penetration of the liquid coating into the interstices of the armature. It is necessary to lift these armatures into and out of the vats, thereby necessitating the use of expensive cranes and other equipment for handling the armatures, especially those of very large motors. Spools of wire tire cord are also large and difficult to handle. The invention is directed to providing a highly simplified apparatus in which spools of wire can be more conveniently handled as they are coated with a liquid.

Briefly stated, the invention is in an apparatus for coating a continuous element, such as a wire tire cord, while it is wound on a spool used in the storage and transportation of the element. The apparatus comprises a generally horizontally elongated chamber which is sealable from the ambient atmosphere. A trackway is provided for guiding spools axially through the chamber. Means are supplied for moving the spools, in tandem, along the trackway in axially aligned end-to-end relation. Means are utilized for circulating liquid coating into the chamber. Means are also provided for alternately creating a vacuum and pressure within the chamber to increase penetration of the liquid coating into the interstices or voids between adjacent segments of the elements wound on the spools, and for drying the liquid coating on the elements of the spools.

DESCRIPTION OF THE DRAWING

The following description of the drawing will be better understood by having reference to the annexed drawing, wherein.

DETAILED DESCRIPTION OF THE INVENTION

Figure 1:
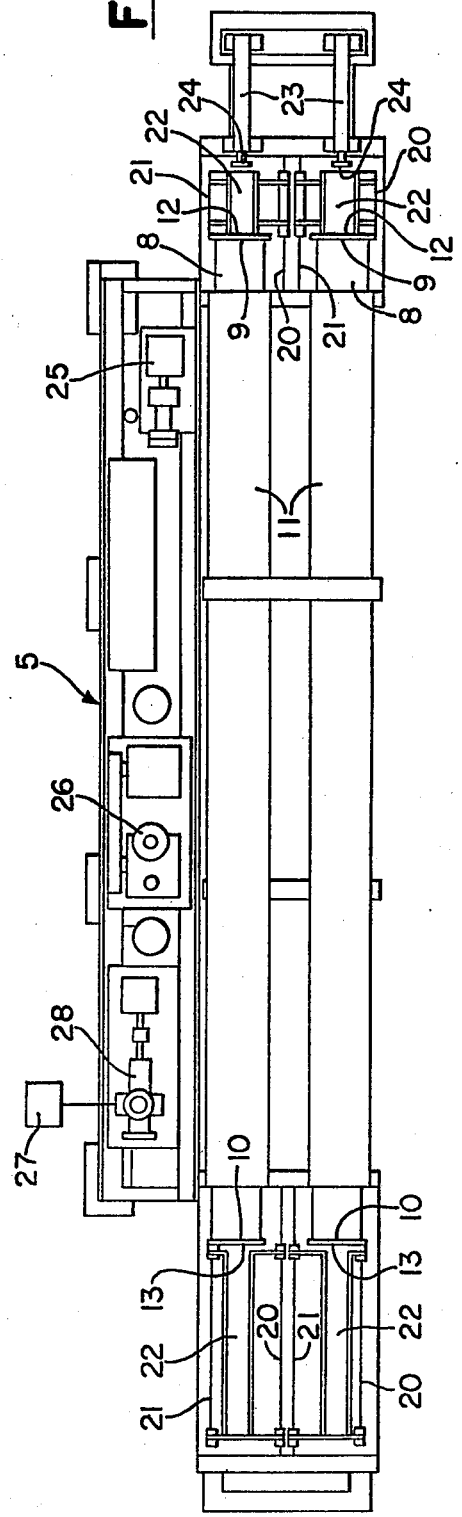
FIG. 1 is a plan view of a wire-treating apparatus made in accordance with the invention.
Figure 2:
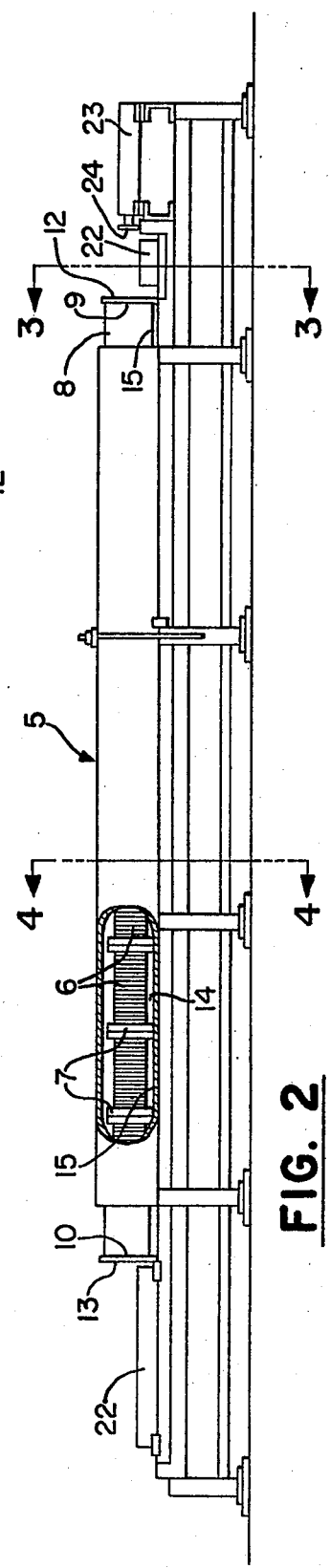
FIG. 2 is a side view of the apparatus.
Figure 4:
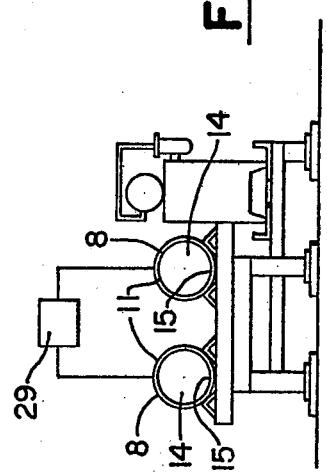
FIG. 4 is a section of the apparatus viewed from the line 4—4 of FIG. 2.
Figure 3:
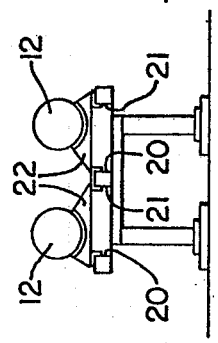
FIG. 3 is a section of the apparatus viewed from the lines 3—3 of FIG. 2.

With reference to the drawing, there is shown an apparatus 5 used in coating continuous elements, e.g. wire tire cord 6 wound on a spools 7 (FIG. 2), with an agent for increasing the bond between the wire tire cord 6 and rubber material used in the production of tires. The wire coating apparatus 5 comprises a pair of parallel, identical, hollow cylindrical tubes or pipes 8, each of which has opposing entrance and exit openings 9,10. Each of the pipes 8 is surrounded by a thermally insulated jacket 11 for receiving a heated fluid, e.g. steam, to heat the pipes 8. A front cover plate 12 is hinged to each of the mouths or entrance openings 9 of the pipes 8, and a rear cover plate 13 is hinged to each of the exit openings 10 of the pipes 8 to seal the treatment chambers 14, formed within the pipes 8, from the ambient atmosphere. The pipes 8 are supported from the floor of a factory building by a frame having a number of increasingly shorter legs from the mouths 9 of the pipes 8, such that the pipes 8 decline slightly from the horizontal for the purpose of allowing liquid trapped within the chambers 14 to flow out the exit openings 10 when the rear cover plates 12 are removed. The curved bottoms 15 of the pipes 8 act as trackways for supporting and guiding the spools 7 of wire 6 through the pipes 8 and chambers 14 in end-to-end, axially aligned relation.

A pair of guide rails 20 and 21 extend in parallel relation from each of the opposing ends 9 and 10 of the pipes 8. A cradle 22 for holding and supporting one or more spools 7 of wire tire cord 6, is removably mounted on each of the pairs of guide rails 20,21. The cradles 22 are movable along the guide rails 20,21 such that the front and rear cover plates 12 and 13 can be rotated to positions where they will not interfere with movement of the spools 7 of wire 6 into and out of the pipes 8.

A hydraulic cylinder 23 with a reciprocable piston is provided in axial, spaced relation from the mouth 9 of each of the pipes 8. Attached to each of the pistons exteriorly of the hydraulic cylinders 23, is a pusher head 24 for engaging and pushing spools 7 of wire 6, placed on the cradles 22 adjacent the mouths 9 into the pipes 8. A hydraulic unit 25, including a supply reservoir, pump and motor, is provided for operating the hydraulic cylinders 23. A number of spools 7 of wire 6 are successively pushed, in tandem, into each of the pipes 8 until they are filled. The cover plates or doors 12,13 are positioned to seal the chambers 14 of the pipes 8 from the ambient atmosphere.

A vacuum is created within each of the chambers 14 by any suitable pumping device 26 to remove any moisture which has collected on the wire 6 of the spools 7. Liquid coating is then circulated, under pressure, into each of the treatment chambers 14 from a source of supply 27 by any appropriate pumping mechanism 28. Simultaneously, the vacuum within each of the treatment chambers 14 is gradually decreased and the liquid pressure increased to facilitate penetration of the liquid coating into the interstices between adjacent segments of wire 6 on the spools 7. A desired liquid pressure can be maintained within the treatment chambers 14, or a vacuum alternately created to help increase the penetration of the liquid coating. Excess liquid coating is drained from the treatment chambers 14 by the pumping mechanism 28 after the wire 6 on the spools 7 has been thoroughly coated or covered. Steam is then circulated through the jackets 11 by any appropriate pumping and heating device 29 to heat the pipes 8 and subsequently dry the liquid coating on the wire 6 of the spools 7 disposed within the treatment chambers 14. Simultaneously, a vacuum is created within the pipes 8 to facilitate drying of the liquid coating. After the drying operation is completed, the rear cover plates 13 are removed and the cradles or spool supports 22 moved into position adjacent the exit openings 10 to receive spools 7 or wire 6 thrust from the pipes 8 by new spools 7 of wire 6 being pushed into the chambers 14. The inside diameters of the pipes 8 are slightly larger than the overall diameters of the spools 7 or wire 6 to insure that the spools 7 move smoothly and unhampered through the pipes 8. Ramps (not shown) can be utilized for conveying spools 7 of wire 6 to and from the cradles 22.

Thus, there has been provided a highly improved device for coating wire tire cord wrapped on a spool on which the tire cord is stored and transported. An apparatus and method for similarly treating a number of spools of wire in a horizontally elongated pipe wherein the spools are caused to roll, by gravity, is described in copending application Ser. No. 682709, filed on the same date as this application now U.S. Pat. No. 4,068,617.

What is claimed is:

1. The method of treating wire tire cord comprising providing a plurality of spools each containing an indefinite running length of said wire tire cord wound continuously therearound, inserting said spools endwise in tandem into one end of an elongated hollow cylindrical pipe so as to fill the length of said pipe, closing the ends of the pipe, circulating liquid coating around said wire tire cord on said spools in said pipe, effecting a vacuum in said pipe, draining surplus of said liquid coating from said wire tire cord on the spools and from said pipe, heating said pipe to dry said liquid coating on said wire tire cord wound about said spools, and pushing said plurality of spools with dried coating thereon from the other end of said pipe by inserting a next plurality of spools into said pipe by way of said first end.

* * * * *